United States Patent [19]
Dial et al.

[11] 3,848,466
[45] Nov. 19, 1974

[54] MAGNETIC TEMPERATURE SENSOR

[75] Inventors: Ralph E. Dial, Concord; John J. Keyes, Jr., Oak Ridge; John W. Krewson, Jr., Norris, all of Tenn.

[73] Assignee: The United States of America as represented by the United States Atomic Energy Commission, Washington, D.C.

[22] Filed: Jan. 30, 1974

[21] Appl. No.: 438,083

[52] U.S. Cl............. 73/349, 73/362 CP, 176/19 R, 324/34 TE
[51] Int. Cl......................... G01k 7/38, G01k 13/02
[58] Field of Search..73/339 R, 349, 362 R, 362 CP; 176/19 R; 324/34 TE

[56] References Cited
UNITED STATES PATENTS

| | | | |
|---|---|---|---|
| 1,697,148 | 1/1929 | Spooner | 73/362 CP UX |
| 2,350,329 | 6/1944 | Hornfeck | 73/362 CP |
| 2,989,691 | 6/1961 | Cook | 324/34 TE |
| 3,164,993 | 1/1965 | Schmidt | 73/362 R |
| 3,421,374 | 1/1969 | Wieting et al. | 73/362 R X |

FOREIGN PATENTS OR APPLICATIONS

| | | | |
|---|---|---|---|
| 438,489 | 12/1926 | Germany | 73/362 CP |

*Primary Examiner*—Richard C. Queisser
*Assistant Examiner*—Frederick Shoon
*Attorney, Agent, or Firm*—John A. Horan; David Zachry; David E. Breeden

[57] ABSTRACT

A sensor for determining rapid temperature changes at the surface of nonmagnetic structures. A thin layer of a material of sufficiently high magnetic permeability and Curie temperature is bonded to the surface to be monitored and a magnetic field is induced in the layer. A sensing coil detects changes in the permeability of the magnetic material layer via changes in impedance and/or phase shift as a function of the layer temperature.

5 Claims, 4 Drawing Figures

3,848,466

MAGNETIC TEMPERATURE SENSOR

BACKGROUND OF THE INVENTION

The present invention was made during the course of, or under, a contract with the United States Atomic Energy Commission.

This invention relates generally to temperature sensing devices and more specifically to a noncontact temperature sensing device for measuring the temperature of a nonmagnetic surface by sensing the change in permeability of a layer of high magnetic permeability and Curie temperature material bonded to said surface.

The need frequently arises for a means by which the instantaneous temperature of a surface or wall in contact with the corrosive or solvent liquid may be measured without compromising the integrity of the wall as a barrier against penetration of the liquid. This is particularly true in heat-transfer apparatus used in nuclear applications where safety requirements dictate the absolute containment philosophy.

Thermocouples as temperature sensors are often eliminated from consideration because they require penetration through the containment wall or, alternatively, grooving of the wall to receive the thermocouple leads. Furthermore, thermocouple insulators are amenable to corrosive attack by the liquid if not protected by sheaths or end caps which decrease response time. Measurement of the temperature fluctuations of a surface exposed to flowing alkali metals or alkali metal salts is particularly difficult because the liquid (a) reacts with most insulator materials, (b) easily penetrates small cracks and flaws in welds, and (c) shorts out unprotected thermocouple leads. A specific application for temperature detection involving the above-cited problems with an alkali metal is that relating to research on fuel rod temperatures immersed in liquid sodium as a coolant. This is the condition which exists in research directed toward the liquid Metal Fast Breeder Reactor (LMFBR) program. At the Oak Ridge National Laboratory one phase of the LMFBR program involves a study of simulated fuel elements, in the form of tubular electrical heaters, in water and in liquid sodium. It is desirable to monitor the exterior surface of the heater sheaths both in steady state as well as transient state so as to determine general heat transfer, incipient boiling and/or heater burnout. Thermocouples or other thermoelectric elements have been utilized; however, the problems cited above exist for all these temperature sensing devices. Furthermore, the devices of the prior art do not accurately measure the temperature of the exterior of a sheath (due to a temperature gradient through the wall) nor can the entire surface be monitored for temperature changes at an unpredictable point.

Various electromagnetic temperature sensing techniques are known in the art which respond to the Curie temperature of certain ferromagnetic materials. These known techniques are operative over a very limited temperature range; and for the most part, respond to discrete temperatures only. Ferromagnetic alloys are picked which have a Curie temperature corresponding to the discrete temperature to be measured and used in an electromagnetic circuit which responds to the loss of magnetic properties of the particular alloy at the Curie point to indicate the discrete temperature.

Of the known techniques, there are none applicable to measurement of rapdily fluctuating surface temperature where the requirement is imposed that the temperature be measured over a wide and continuous range up to the Curie temperature with a single ferromagnetic material sensor layer. Further, there are no systems known which satisfy the above requirement with the additional requirement that the sensor layer be in contact with a corrosive fluid which cannot be permitted to penetrate to the electromagnetic sensing coil positioned outside a containment surface being monitored.

SUMMARY OF THE INVENTION

In view of the above, it is an object of this invention to provide a means for noncontact measurement of the temperature of a surface over a wide and continuous range.

Another object of this invention is to provide a means for noncontact measurement of the temperature of nonmagnetic containment surface exposed to a corrosive fluid by placing a layer of ferromagnetic material on said surface in contact with said fluid and monitoring the changes in permeability of said layer corresponding to changes in temperature of said surface over a broad and continuous range by sensing the phase shift in an electromagnetic circuit coupled with said layer due to said change in permeability of said layer.

Other objects and many of the attendant advantages of the present invention will be apparent from the following detailed description taken in conjunction with the accompanying drawings.

DETAILED DESCRIPTION

Figure 1:
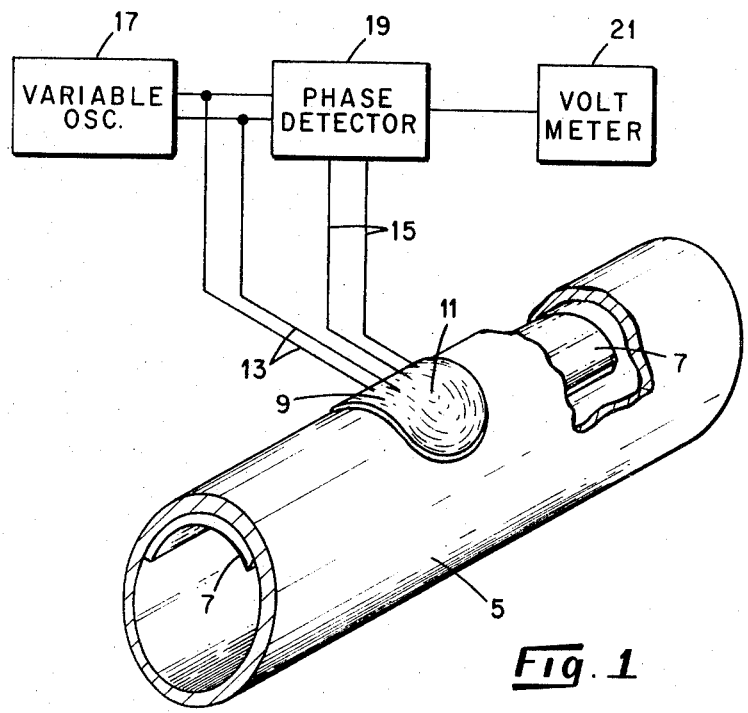
FIG. 1 is a schematic diagram of an electromagnetic temperature sensing system according to the present invention.

Referring now to FIG. 1, there is shown one embodiment of the invention for detecting temperature and changes of temperature of the inner surface of a nonmagnetic pipe 5. A very thin layer of a ferromagnetic material 7 is bonded on the inner surface of pipe 5 and a pair of electrically insulated, bifilar wound coils 9 and 11 is disposed on the outer surface of the pipe 5 opposite the layer of ferromagnetic material 7. The coils 9 and 11 may be wound in a bifilar spiral arrangement and contoured, as shown, to fit the outer pipe surface so as to provide a uniformly distributed magnetic flux to the layer 7 in the area where the temperature is to be detected. The exciting coil 9 is connected to the output of a variable oscillator 17 by means of leads 13 and the other coil 11 is connected to one input of a phase detector 19, via leads 15, which is connected to receive the oscillator 17 signal at another input. The phase detector, which may be of various known types, produces an output signal whose amplitude is indicative of the difference in phase between the two input signals. The output of the phase detector 19 is connected to a voltmeter 21 which may be calibrated to read degrees Fahrenheit.

In operation, the exciting coil 9 is energized by the oscillator 17 at a particular frequency, as will be explained hereinbelow, to induce magnetic fields in the ferromagnetic material layer 7 which are reflected into the pickup coil 11. The phase displacement between the exciting signal from oscillator 17 and the signal induced in the pickup coil is indicative of the layer 7 temperature. A change in temperature causes a change in the magnetic permeability of the ferromagnetic material layer 7 which, in turn, affects the phase of the signal induced in the pickup coil 11. The voltmeter is then calibrated to read the temperature of the material 7. Since the material 7 is very thin layer (approximately 0.002 to 0.005 in. thick), it assumes the inner surface temperature of pipe 5 and thereby provides a measure of the inner surface temperature.

Figure 2:
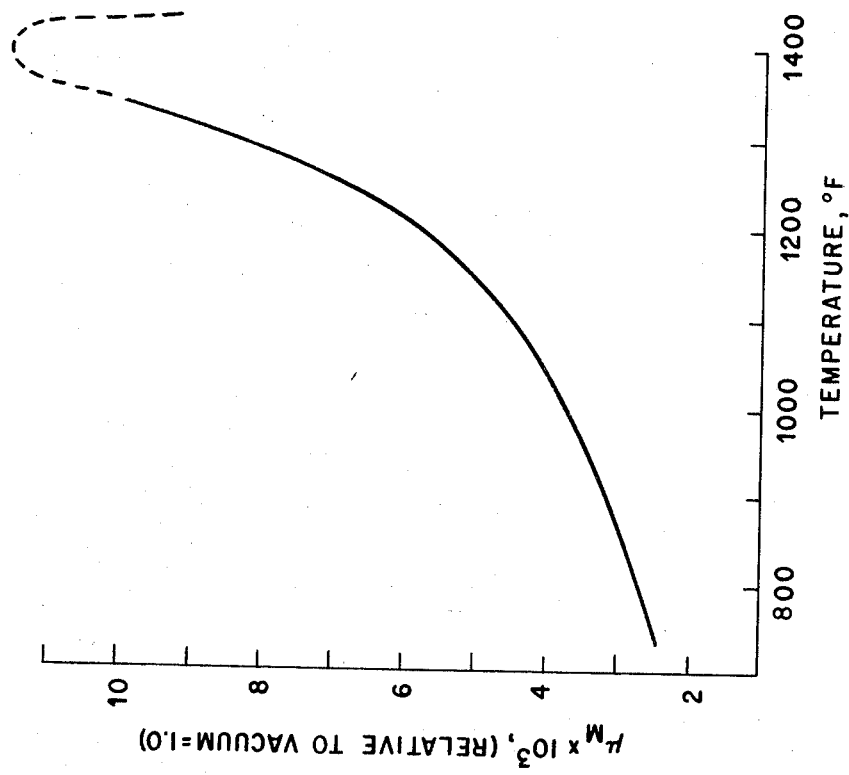
FIG. 2 is a plot of magnetic permeability, as a function of temperature, for Armco iron.

Ferromagnetic materials are well known to have a variation in magnetic permeability, as a function of temperature, up to the Curie point for the particular material. At the Curie point, the material becomes nonmagnetic. A typical plot of magnetic permeability, $\mu_M$, of a ferromagnetic material as a function of temperature is shown in FIG. 2. This plot is one of a series supplied by Armco Research Laboratories for Armco iron. The Curie point for this material is about 1,400°F giving rise to the rapid change of permeability as that temperature is approached. Although not shown here, the influence of this permeability change as a function of temperature is greater than that of the corresponding resistance change when the temperature is within 300°–700°F of (and below) the Curie temperature.

The nuclear applications for a temperature sensor involve surfaces of nonmagnetic materials, such as stainless steels, in contact with active fluids. If, however, a thin layer of a ferromagnetic material is placed on the surface, as shown in FIG. 1, whose temperature is to be measured, that material must be compatible with the fluid. In the case of sodium as the heat transfer medium, an iron layer, such as Armco iron (99+% Fe), is applicable because of its compatibility at anticipated temperatures (up to 1,300°F). Other reasons for the choice of Armco iron include: (a) it has a relatively high thermal conductivity and diffusivity compared with stainless steel and, because it is much thinner, will assume an average temperature close to that of the stainless steel surface; and (b) it has a much smaller skin depth of penetration of the a.c. field than does the underlying stainless wall. Thus, it is possible to operate at a frequency sufficiently low that the field penetrates the stainless wall but is absorbed in the iron whose temperature is to be determined.

There are several alternative techniques which may be employed to convert change in permeability of the iron, due to temperature changes, to a useable electrical signal. For example, in early experiments a single-winding coil was made the fequency-controlling inductance, L, in a resonant LC oscillator and the resonant frequency change due to change in L with permeability was measured. The method is potentially extremely sensitive since small frequency changes can be measured by conventional beat-frequency methods. However, the maximum frequency at which a coil of reasonable size (diameter, length and turns per inch) could oscillate stably in typical oscillator circuits was too high for optimum sensitivity in this experiment.

As another technique, the change in impedance of a resonant circuit with the single-winding coil as the inductance can be measured by measuring the voltage developed across the parallel LC circuit when excited by a separate oscillator at a frequency for which the circuit is resonant. This method is less sensitive, however, than the above.

The preferred method for making high sensitivity measurements related to temperature change employs the phase-shift technique as described in reference to FIG. 1 in which the phase of a voltage applied to an exciting coil is compared with that of a signal reflected into a pickup coil by the high permeability layer. This has the significant advantage that the frequency can be varied over a wide range for a given coil geometry. The phase shift is converted to a voltage output by means of phase-shift sensitivity of the detector.

Figure 3:
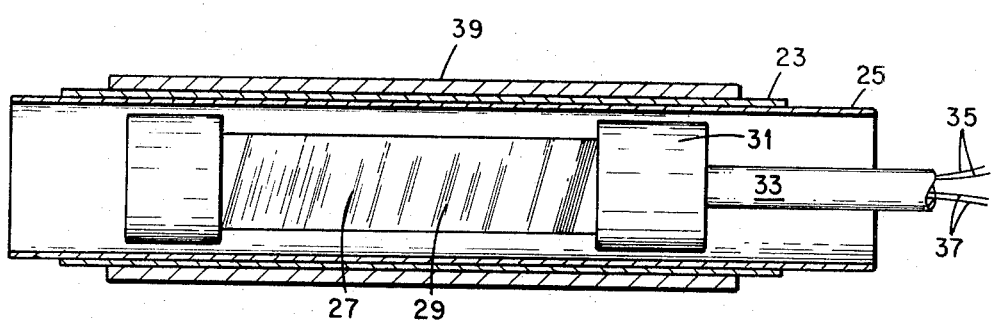
FIG. 3 is a cross-sectional view of a test sensor constructed according to the present invention.

The embodiment for testing the subject development is illustrated in FIG. 3. A 0.005 in. thick sleeve 23 of Armco iron was press-fitted around a 0.750 in. OD × 0.020 in. wall tube 25 of type 304 stainless steel. A pair of coils 27, 29 was bifilar wound upon an insulating bobbin 31. The exciting/sensing probe was concentric with both the sleeve 23 and tube 25 and was mounted upon the end of insulating tubing 33. A pair of lead wires 35 from the variable oscillator 17 (as shown in FIG. 1) extends through tubing 33 to connect to exciting coil 27. Also feeding through tubing 33 is a pair of lead wires 37 connecting sensing winding 13 with the phase detector 19 (FIG. 1). As a substitute for sodium, a thick-walled bronze sleeve 39 was fitted over the Armco iron layer 23. Bronze was chosen because of the similarity of physical constants to those of sodium, primarily the electrical conductivity.

Figure 4:
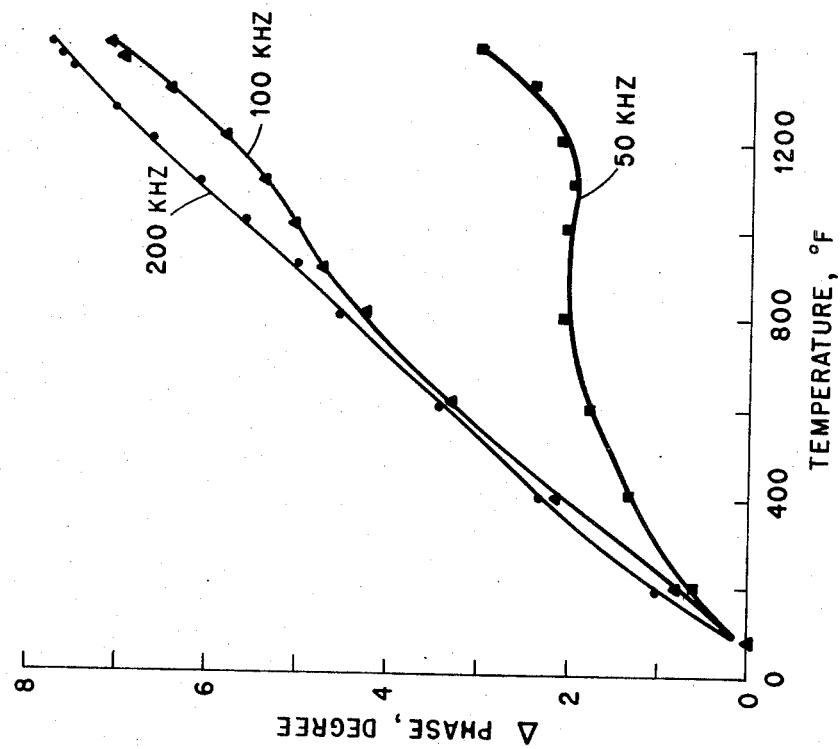
FIG. 4 is a plot illustrating the response of the test sensor shown in FIG. 3 at three excitation frequencies as a function of temperature.

The embodiment was operated in a furnace at several steady-state temperatures. The exciting coil was driven at frequencies from 10 kHz to 500 kHz. The phase shift between the exciter a.c. signal and the sensed signal was determined at each temperature and each frequency. A similar test was made using an identical construction except without the iron. By subtracting the two phase-shift results, an approximate steady-state response curve (phase shift vs. temperature) was determined for the iron. This response curve is shown in FIG. 4. Although not shown in this figure, response was very poor at frequencies near 500 kHz. The curves in FIG. 4 indicate that there is an optimum frequency (apparently 200 kHz) for which the sensitivity (slope) under steady conditions is a maximum. The shape of the curves, as related to frequency, results from the complicated interaction of penetration depth (frequency dependent) and the influence of change in electrical resistivity with temperature which is opposite to the effect of change in permeability. It is not necessary that the oscillator be set to give a linear response, but desirable for calibration over the full temperature range.

The transient response time constant for the test instrument was calculated to be less than 0.005 millisecond. This response is faster than conventional thermocouple-type temperature measuring devices. For a full-sized simulated fuel element, a transient response of less than a millisecond should be achievable.

Although iron is particularly appropriate for applications where the ferromagnetic material is in contact with liquid sodium up to 1300°F, other ferromagnetic materials may be utilized in the subject development.

This includes many iron, nickel and cobalt alloys. The temperature of operation, the environment, and the sensitivity required will determine which ferromagnetic material is preferred for a particular application. Furthermore, the ferromagnetic material need not be continuous, but can be deposited over a specific area whose surface temperature is to be monitored.

As set forth above, the unique features of the subject development are the use of an "active" coating of ferromagnetic material on the surface to be measured and the complete isolation between the active coating and the sensor coil. Within this framework, a variety of geometrical configurations and wall materials (including electrical insulators) are possible and a broad spectrum of temperature-sensing applications are envisioned involving nearly any fluid environment. For example, a potential use for the device is as a detector of incipient burnout of a heated tube when it is desired to monitor a large surface area and to shut off power to the heater should burnout conditions be approached at any local hot spot. In this application it is only necessary that a small fraction of the total ferromagnetic surface, through which the magnetic field is linked to the pickup coil, exceed the Curie temperature in order for a significant change in sensor output.

For the simulated fuel element studies, where electrical bayonet heaters are utilized in a sodium environment, the exterior portion of the heater sheaths may be covered by a layer of Armco iron of 0.002 to 0.005 in. thickness in the area where temperature monitoring is desired. The exciter/sensor coils may be wound in the heater insulation or, alternatively, the heater element may serve as one coil for the sensor. In the latter case, a discriminator circuit may be used to determine phase shifts of the high frequency excitation in contrast to the low frequencies used for heaters. In the case of temperature monitoring of actual fuel elements, coils may be embedded in special pellets at desired locations in the fueled tube. The iron coating may be placed on the outside of the fuel tube adjacent to the interior coils.

What is claimed is:

1. A temperature sensor for monitoring the temperature and detecting rapid temperature changes of one surface of a wall of nonmagnetic material comprising:

a layer of ferromagnetic material disposed in contact with said one surface of said wall;

at least one electromagnetic coil disposed on the other surface of said wall opposite said one surface from said layer;

an electrical signal source connected to said coil for inducing magnetic fields in said layer, and means responsive to the changes in current induced in said coil from changes of the magnetic permeability of said layer with changes in temperature of said one surface for indicating the temperature of said one surface.

2. The temperature sensor as set forth in claim 1 wherein said at least one coil includes a pair of bifilar wound coils, wherein said electrical signal source is a variable oscillator connected to a first coil of said pair of coils, and wherein said means for indicating the temperature of said one surface includes a phase detector having a first input connected to the output of said oscillator, a second input connected to the other coil of said pair of coils and an output for providing a signal whose amplitude is indicative of the phase difference between the signal at the output of said oscillator and the signal induced in said other coil corresponding to the magnetic permeability of said layer at a specific temperature.

3. The temperature sensor as set forth in claim 2 wherein said one surface is a containment surface for a corrosive fluid and wherein said layer is formed of a ferromagnetic material compatible with said corrosive fluid and has a Curie temperature greater than the upper range of temperature to be measured.

4. The temperature sensor as set forth in claim 2 wherein the temperature of said one surface to be monitored is in the range of from about 100° to 1,400°F and said layer of ferromagnetic material is iron having a Curie temperature of about 1,400°F.

5. The temperature sensor as set forth in claim 4 wherein said variable oscillator is set at a frequency to produce a substantially linear change in phase displacement between the oscillator output signal and the signal induced in said other coil for changes in temperature of said layer within the range of temperatures to be monitored.

* * * * *